United States Patent [19]

Bongard et al.

[11] 4,223,217
[45] Sep. 16, 1980

[54] FIBER OPTIC ELECTRIC SWITCH

[75] Inventors: James A. Bongard; Eugene F. Duncan, both of Milwaukee; James R. Jaeschke, Greendale, all of Wis.

[73] Assignee: Eaton Corporation, Cleveland, Ohio

[21] Appl. No.: 796,400

[22] Filed: May 12, 1977

[51] Int. Cl.² .............................................. G02B 5/14
[52] U.S. Cl. ...................................... 250/227; 250/229
[58] Field of Search ........... 250/551, 227, 229, 237 R, 250/237 G, 216; 340/365 P; 350/96.13, 96.14

[56] References Cited

U.S. PATENT DOCUMENTS

| 2,357,971 | 9/1944 | Robbins | 200/16 |
|---|---|---|---|
| 2,460,034 | 1/1949 | Robbins | 200/16 |
| 2,568,933 | 9/1951 | Robbins | 200/17 |
| 2,641,753 | 6/1953 | Oliwa | 340/345 |
| 2,878,368 | 3/1959 | Nolden et al. | 200/16 |
| 2,908,776 | 10/1959 | Nolden et al. | 200/4 |
| 2,930,859 | 3/1960 | Nolden et al. | 200/16 |
| 3,235,741 | 2/1966 | Pliasance | 250/229 |
| 3,336,482 | 8/1967 | Mierendorf et al. | 250/229 |
| 3,393,323 | 7/1968 | Breuning | 250/221 |
| 3,581,003 | 5/1971 | Leone | 178/17 |
| 3,588,512 | 6/1971 | Hollien | 250/214 |
| 3,758,785 | 9/1973 | Maute | 250/229 |
| 3,783,274 | 1/1974 | Towne et al. | 250/221 |
| 3,787,837 | 1/1974 | Allen et al. | 340/365 P |
| 3,793,492 | 2/1974 | Duncan et al. | 200/47 |
| 3,819,888 | 6/1974 | Duncan | 200/47 |
| 3,882,290 | 5/1975 | Duncan | 200/47 |
| 3,886,544 | 5/1975 | Narodny | 340/365 P |
| 3,906,222 | 11/1974 | Astier et al. | 250/229 |
| 3,949,219 | 1/1975 | Crouse | 250/229 |
| 3,983,343 | 9/1976 | Duncan | 200/47 |
| 3,999,074 | 12/1976 | Callaghan | 250/551 |

Primary Examiner—David C. Nelms
Attorney, Agent, or Firm—William A. Autio; Hugh R. Rather

[57] ABSTRACT

A preassembled self-contained fiber optic module is disclosed which may be inserted in standard switch enclosures to enable a remote electrical switching function to be performed by means of optical switching within the switch enclosure. A single module mounts facing ends of two fiber optic cables in spaced substantially colinear alignment and also forms a narrow elongated guiding channel perpendicular to the colinear axis of the cables and intersecting the gap therebetween for guiding an operator-driven opaque shutter which is movable into the gap to block the optical path between the facing ends of the cables. Transducer means are provided at the remote ends of the fiber optic cables to supply an electrical signal in response to optical transmission. A fiber optic limit switch and a fiber optic pushbutton switch are specifically disclosed.

30 Claims, 22 Drawing Figures

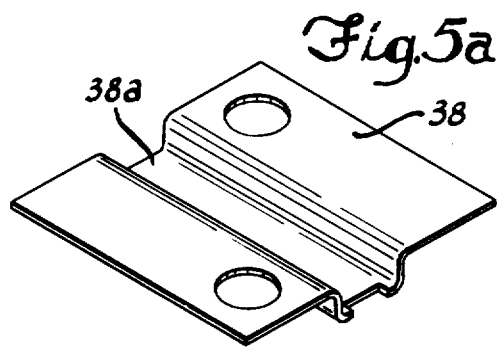
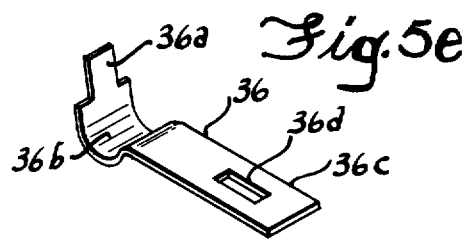
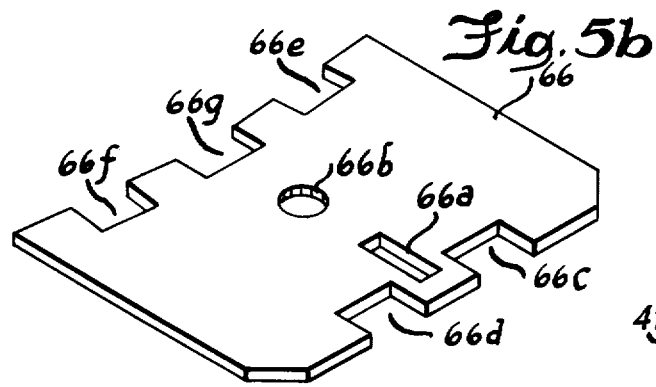
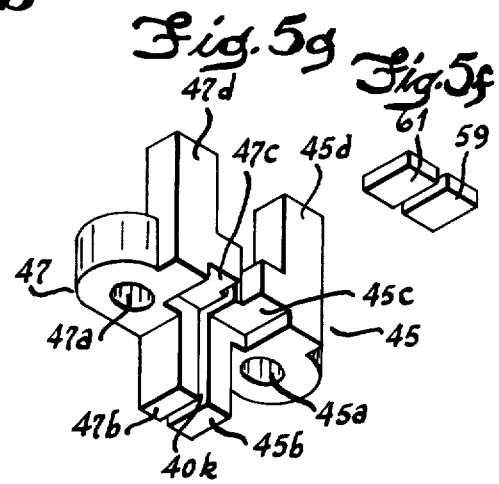
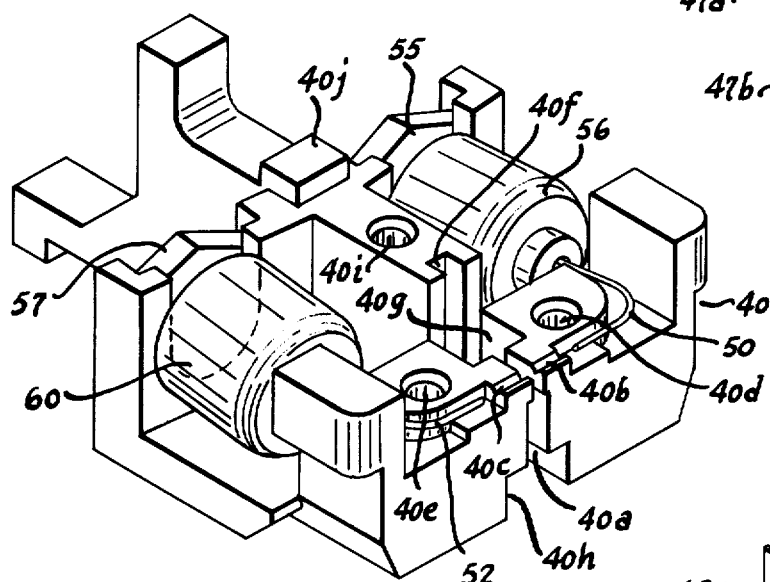
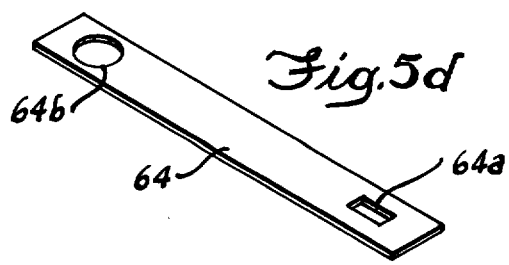
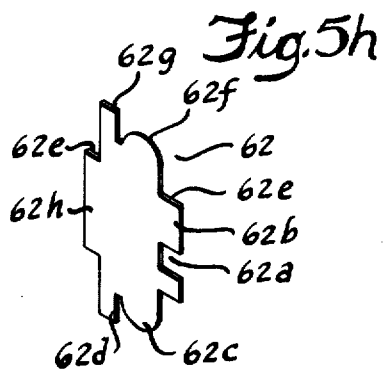

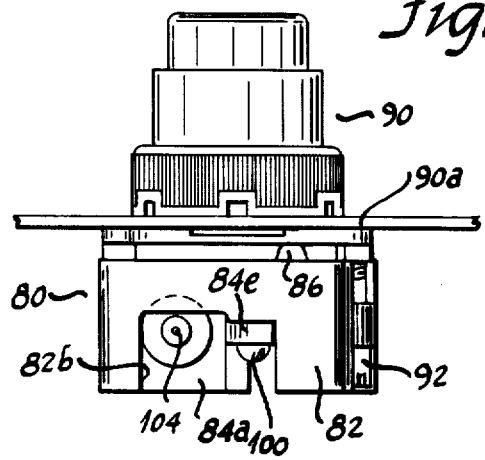
Fig. 6
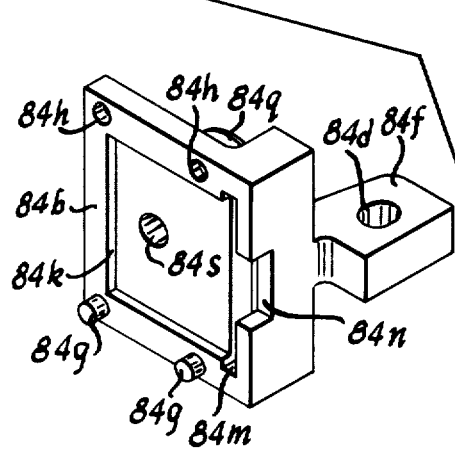
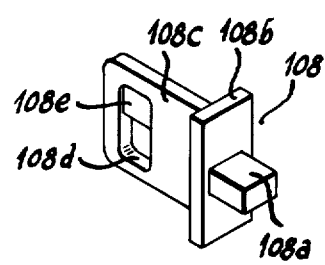
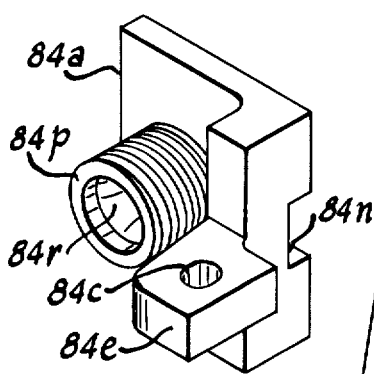
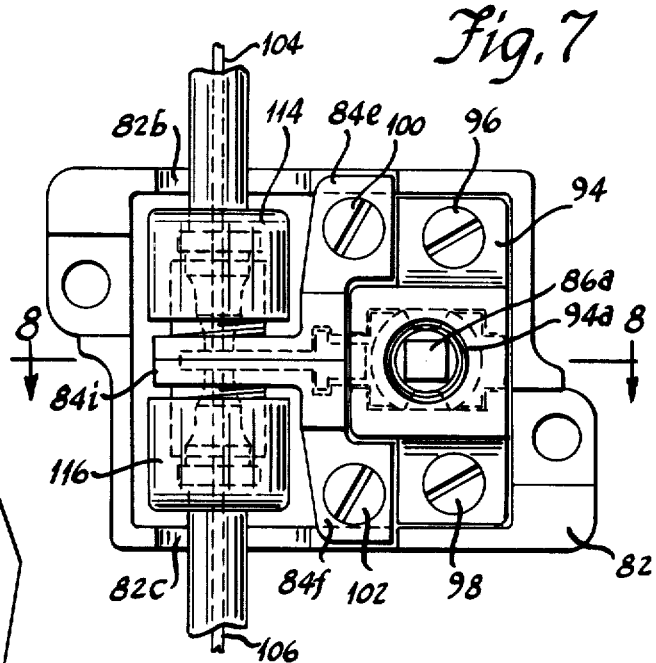
Fig. 7
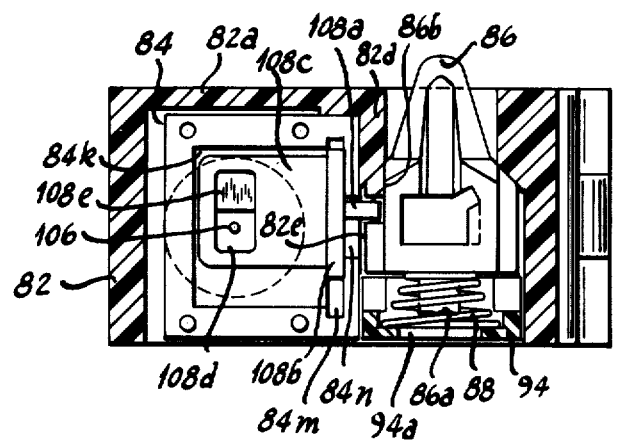
Fig. 8 atent No. 4,223,217

FIBER OPTIC ELECTRIC SWITCH

BACKGROUND OF THE INVENTION

Optical switching is known in the art wherein a lamp and a photodetector are mounted in a switch housing and a shutter is driven therebetween to block the transmission of light. Appropriate cavities may be formed in the housing for mounting the lamp and photodetector therein, and appropriate apertures are formed in certain internal portions of the housing to form light guides.

SUMMARY OF THE INVENTION

An object of the invention is to provide a fiber optic electric switch wherein fiber optic cables form the lightguide means.

Another object is to provide extremely accurate axial and lateral positioning of facing spaced fiber optic cable ends to minimize transmission losses in the gap therebetween while also affording a narrow elongated channel intersecting said gap for guiding a shutter to be driven between the cable ends. This object is fulfilled by a single mounting means which accomplishes both purposes by performing the dual functions of mounting the facing cable ends in spaced substantially colinear relation and forming a narrow elongated guiding channel perpendicular to the colinear axis of and intersecting the gap between the facing cable ends. It is because the same means performs both functions that the high degree of accuracy in cable positioning is attained to best minimize tolerance deviations in the combination of both axial gap and lateral displacement.

Another object is to provide a switch of the aforementioned character wherein the mounting means is a preassembled self-contained module insertable in standard switch enclosures to enable simple and economical adaptation of an electric switch to a fiber optic switch with a minimum of additional or modified parts, and to minimize tolerance deviations in the positioning of the facing cable ends since they are axially and laterally fixed before insertion into the switch housing.

Another object is to provide a switch of the aforementioned character which is easily convertible between normally open and normally closed.

Another object is to provide a switch of the aforementioned character for controlling a remote electrical switching function whereby to afford use of the present invention in intrinsic safety applications because of the absence of electric current, and also to afford electrical isolation from an electrically noisy environment where magnetic disturbances, etc., may be present.

Other objects and advantages will hereinafter appear.

BRIEF DESCRIPTION OF THE DRAWINGS

FIGS. 5a through 5h show an exploded isometric view of the fiber optic module used in the switch of FIGS. 1 to 4.

FIG. 6 is a side elevational view of a pushbutton switch constructed in accordance with the invention.

FIG. 7 is an enlarged bottom view of the switch of FIG. 6.

FIG. 8 is a cross-sectional view taken along line 8—8 of FIG. 7 with the operating head removed.

FIG. 9 is an exploded isometric view of the fiber optic module used in the switch of FIGS. 6-8.

DESCRIPTION OF THE PREFERRED EMBODIMENT

Figure 1:
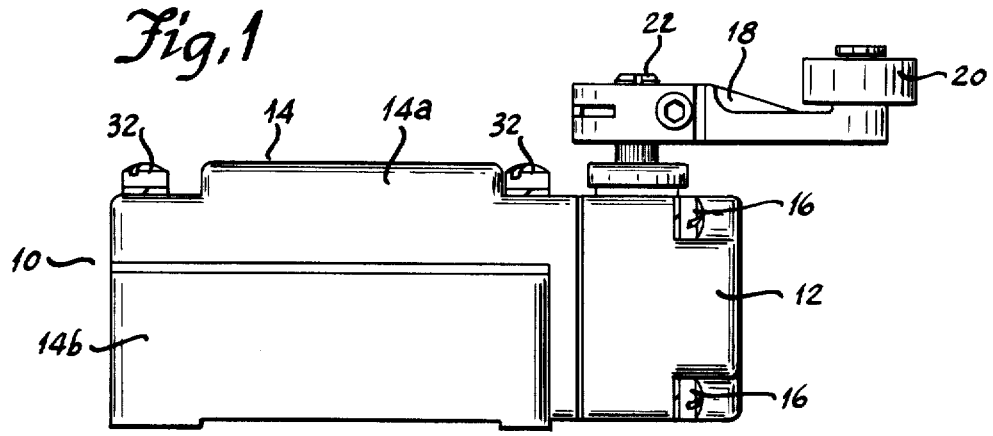
FIG. 1 is a side elevational view of a limit switch constructed in accordance with the invention.

FIGS. 1 to 5 show a limit switch constructed in accordance with the invention and FIGS. 6 to 9 show a pushbutton switch constructed in accordance with the invention. The limit switch will be described first.

The limit switch 10 is like those disclosed in U.S. Pat. Nos. 3,983,343; 3,882,290; 3,819,888; and 3,793,492. Operating head 12 is mounted to housing 14 by four screws 16. The operating head is provided with an operating arm 18 having a roller 20 at its swingable end for engagement by a moving machine part or the like that moves arm 18, hence operating switch 10. Arm 18 is mounted to shaft 22, rotation of which causes right-left movement of plunger 24, FIG. 2, which in turn moves through an overcenter position of a snap-action contacting mechanism to cause left or right snap-action movement of bridging contactor 26 against contacts such as 28 or 30, all as described in more detail in said Patents, which are hereby incorporated herein for further reference.

Housing 14 has an upper portion 14a mounted to a lower portion 14b by screws 32. A sealing gasket 15 is provided around the perimeter between the upper and lower housing portions. Upper portion 14a has an insulating enclosure 34 enclosing the snap-action contacting mechanism. This enclosure has an opening 34a in a right side wall through which plunger 24 extends, and an opening 34b in a bottom wall 34c through which a reduced end portion 36a of a lever 36, FIGS. 2 and 5e, extends upwardly to engage contactor 26. Contactor 26 and the snap-action mechanism in upper housing portion 14a are not used to make and break an electrical circuit, but rather for the mechanical snap-action movement provided thereby to impart motion to lever 36. Contacts 28 and 30 are not connected to an electrical circuit but are retained to provide stops for the left-right movement of contactor 26. It is thus seen that the actuating mechanism of prior limit switches, such as shown in said Patents, may be used in the present invention to drive lever 36, thus reducing cost by using existing standard parts.

Figure 2:
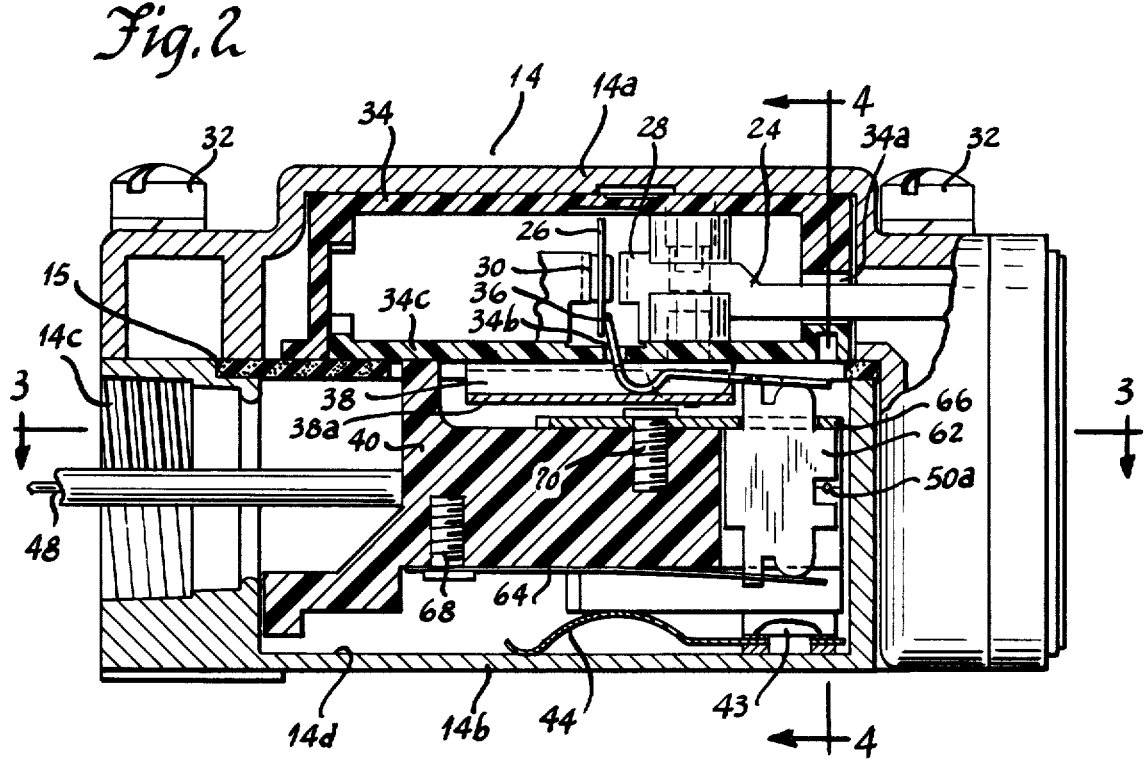
FIG. 2 is an enlarged cross-sectional view of FIG. 1 with the operating head removed.

Mounted to the underside of bottom wall 34c is a retaining plate 38 having a central horizontally elongated rectangular groove portion 38a, FIG. 5a, which is recessed downwardly into open-topped lower housing portion 14b. A curved portion 36b of the lever rests against the recessed top surface of groove portion 38a to afford rocking of the lever thereabout. As seen in FIG. 2, rightward movement of contactor 26 pivots lever 36 clockwise; and leftward movement of contactor 26 allows lever 36 to pivot counterclockwise under the influence of return bias means, to be described hereinafter.

Lower housing portion 14b is comparable to that shown in said Patents and has an open top and a threaded aperture 14c in the left side wall, FIG. 2. Mounted in a lower housing is a fiber optic module 40 which is retained therein by spring clips 42, FIG. 4, mounted to bottom wall 14d by stud 43. The module rests against spring 44, FIG. 2, which is also mounted to bottom wall 14d by stud 43.

Figure 3:
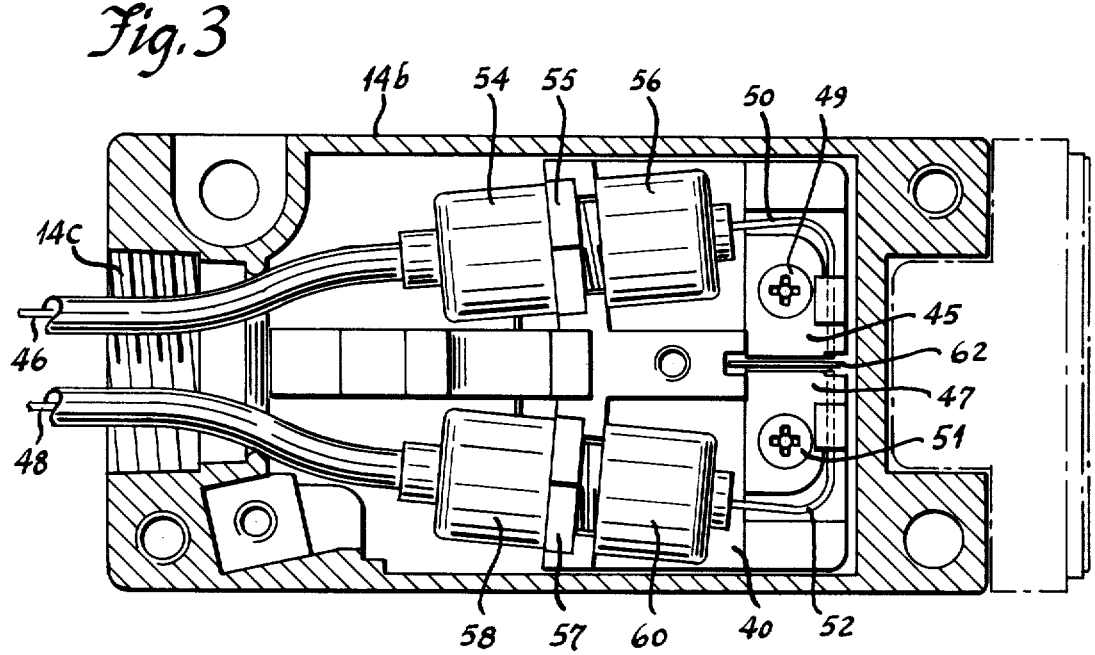
FIG. 3 is a cross-sectional view taken along line 3—3 of FIG. 2.

Standard commercially available connectors 54, 56 and 58, 60, and hex nuts 55 and 57, FIGS. 3 and 5c, are mounted to module 40 to optically couple fiber optic cables 46, 48 to cables 50, 52, respectively. Though singular cables are shown, it is within the scope of the invention to use other types of fiber optic light guiding cable means, for example multiple fiber bundles. Each connector threadingly engages its made and a respective hex nut, the latter being snugly retained in the module by appropriate shouldered slots formed therein to prevent rotation of the nut. The connectors typically have a have a frusto-conical male portion received in a mating frusto-conical female portion of another connector to afford axial alignment of the cables coupled thereby. Cables 46 and 48 are cladded and extend from outside the housing through aperture 14c to connectors 54 and 58, respectively. Cables 50 and 52 extend rightwardly from connectors 56 and 60, respectively, and then are curved inwardly towards each other, terminating to form facing ends, 50a and 52a, defining a small gap therebetween.

Figure 4:
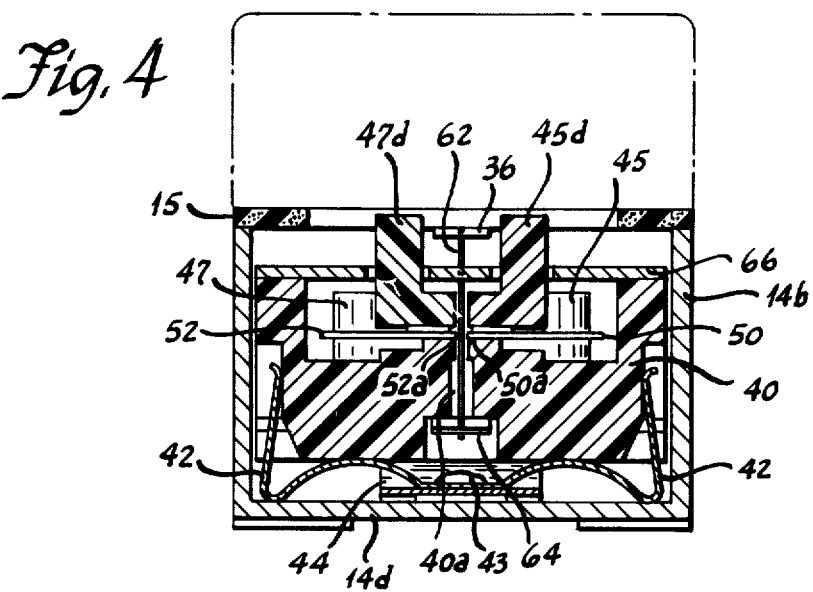
FIG. 4 is a cross-sectional view taken along line 4—4 of FIG. 2.

The right side of the module has a vertical channel 40a formed therethrough, FIGS. 4 and 5c. On opposite sides of this channel, on top surfaces of the module, there are formed a pair of V-shaped grooves 40b and 40c, substantially colinearly aligned. These grooves hold fiber optic cables 50 and 52. A pair of retainer members 45 and 47, FIG. 5g, are mounted to the module by screws 49 and 51, FIG. 3, extending through apertures 45a, 40d and 47a, 40e, respectively. These retainer members have portions 45b and 47b which extend downwardly into a widened section 40g of channel 40a which is to the left of the gap between grooves 40b and 40c. In assembled condition, the retainer members thus provide a narrow section 40k of channel 40a between portions 45b and 47b. The retainer members have shouldered recesses 45c and 47c, formed on the underside of a mid portion thereof which receive wedges 59 and 61, respectively, FIG. 5f. These wedges are made of resilient material and, in assembled condition, the undersides thereof press cables 50 and 52 into the V-shaped grooves 40b and 40c to provide firm retention of facing ends 50a and 52a in spaced coaxial relation.

A thin opaque shutter 62, FIG. 5h, is vertically reciprocal in channel 40a. FIG. 2 shows a normally closed switch wherein the shutter is normally in an up position whereby an optical path is established between facing cable ends 50a and 52a through slot 62a of the shutter. Downward movement of the shutter brings portion 62b into the gap between the cable ends to thus interrupt the optical path therebetween.

The shutter is retained and guided in channel 40a by means of leaf spring 64, FIG. 5d, and a rigid template 66, FIG. 5b. The leaf spring is mounted at its left end to the underside of the module by screw 68, FIG. 2, extending through aperture 64b. The leaf spring extends rightwardly through slot 40h beneath channel 40a to engage rounded bottom portion 62c of the shutter and bias the latter upwardly. The leaf spring has an aperture 64a near its right end through which a downwardly projecting portion 62d of the shutter extends to prevent lateral movement of the shutter. Template 66 is mounted to the topside of the module by means of screw 70 extending through aperture 66b into threaded opening 40i. The template extends rightwardly to overly channel 40a and has an aperture 66a to allow clearance therethrough of upper portions 62f and 62g of the shutter and to prevent lateral movement thereof. The template stops the upwardly biased movement of the shutter when shoulders 62e strike the underside of the template overhanging the channel 40a. Left side 62h of the shutter rides in section 40f of the channel. The vertical midportion of the shutter rides in section 40k of the channel formed between portions 45b and 47b of the retainer members. The right side of the shutter, 62a and 62b, rides in the gap between the V-shaped grooves 40b and 40c holding the fiber optic cable ends.

Notches 66c and 66d are formed in the template through which retainer member portions 45d and 47d, respectively, extend upwardly to terminate adjacent the bottom of the upper Notches 66e and 66f allow clearance of the points of hex nuts 55 and 57, respectively. Raised portion 40j of the module extends upwardly through notch 66g to position the template.

Lever 36 has a straight portion 36c extending rightwardly from curved portion 36b, FIGS. 2 and 5e, beyond rectangular groove 38a of retaining plate 38. The underside of the right end of lever portion 36c engages rounded upper portion 62f of the shutter to drive the shutter downwardly against the bias of leaf spring 64 in response to clockwise rocking or pivoting of lever 36 about curved portion 36b resting in groove 38a. Leaf spring 64 biases the shutter upwardly which in turn biases lever 36 counterclockwise whereby reduced end portion 36a is biased against contactor 26, FIG. 2. Portion 36c of the lever has an aperture 36d near its right end through which upwardly projecting portion 62g of the shutter extends.

It should be noted that, except for portions 62a and 62b, the shutter is symmetrical about a horizontal left-right axis, FIG. 5h, whereby to afford convertibility from a normally closed to a normally open switch merely by 180° rotation of the shutter. A normally open switch would thus have portion 62b of the shutter blocking the optical path between the facing fiber optic cable ends 50a and 52a when the shutter is in its normal upwardly biased position; downward movement of the shutter, caused by rightward movement of contactor 26, FIG. 2, thus brings slot 62a into the gap between the facing fiber optic cable ends, re-establishing the optical path therebetween.

It is thus seen that a compact self-contained fiber optic module is provided which may be inserted in a standard switch housing to provide optical switching. The module not only mounts facing fiber optic cable ends in spaced coaxial relation but also provides a narrow channel in a plane perpendicular to the axis of the cables and intersecting the gap therebetween for guiding a movable shutter.

FIGS. 6 to 9 disclose a pushbutton switch constructed in accordance with the invention. A plunger housing assembly 80 is provided like that shown in U.S. Pat. No. 2,930,859 hereby incorporated by reference, except that the plunger and contacts in the left compartment of the housing 82, FIG. 8, have been replaced by a fiber optic module 84. Screws 92 mount the plunger housing assembly 80 to the face plate 90a of a pushbutton operating head 90, such as shown in U.S. Pat. Nos. 2,930,859; 2,908,776; 2,568,933; and 2,460,034. Numerous other means could be used to depress plunger 86, FIG. 8, for example rotary selectors such as shown in U.S. Pat. Nos. 2,878,368 and 2,357,971, or directly by the user.

Plunger 86 is biased upwardly by a frusto-conical spring 88, FIG. 8, bearing between the underside of the plunger and a bottom plate 94 which is mounted to the housing 82 by screws 96 and 98, FIG. 7. The bottom wall 94 has an aperture 94a through which a second plunger could upwardly extend from a second plunger housing assembly piggybacked therebelow, the second plunger being engaged by downwardly projecting portion 86a of plunger 86 in response to downward movement of plunger 86.

The left compartment of housing 82 has a closed top wall 82a, FIG. 8, and is open-bottomed for insertion of fiber optic module 84 from below. The module is mounted by screws 100 and 102, FIG. 7, extending through apertures 84c and 84d in wings 84e and 84f, respectively, of the module, FIG. 9. Front and back walls of the left compartment of housing 82 have upwardly extending slots 82b and 82c to allow clearance therethrough for cladded fiber optic cables 104 and 106. A dividing wall 82d, FIG. 8, between the compartments of the housing has an aperture 82e to allow vertical reciprocal movement of a tongue portion 108a of a shutter 108, FIGS. 8 and 9. This tongue portion fits in a notch 86b in plunger 86 to provide a direct mechanical connection therebetween.

The fiber optic module comprises two identical halves 84a and 84b assembled together by ultrasonic bonding and aligned by mating bosses 84g and apertures 84h. When assembled, the module has a general T-shape in top or bottom elevation, FIG. 7, with wing portions 84e and 84f forming the ends of the cross-bar of the T, and portion 84i forming the trunk portion. This trunk portion is vertically planar. Each half of the module has an externally threaded female fiber optic connector portion, 84p and 84q, formed therewith. Each half has a frusto-conical aperture, 84r and 84s, formed through the connector portion. Since the halves are identical, the apertures are aligned when the halves are assembled, with the smallest parts of the apertures being internal. Each half has a generally coplanar recessed shallow cavity, such as 84k, formed therein to thus provide an internal cavity coplanar with trunk portion 84i when assembled.

Shutter 108 is an integral member having a general T-shape in top or bottom elevation, with cross-bar portion 108b extending in the plane of the cross-bar portion of the T-shaped module 84, and with trunk portion 108c extending in the plane of the trunk portion of the T-shaped module 84. Tongue 108a extends rightwardly, FIG. 9, from cross-bar portion 108b. Deeper recesses 84m, FIG. 9, are formed in the module halves at the right ends of recesses 84k to thus provide a T-shaped internal cavity, in top view, in module 84 whereby to provide a guiding channel for vertical reciprocal movement of the shutter and prevent lateral movement thereof; cross-bar portion 108b being guided in recesses 84m, and trunk portion 108c in recesses 84k. Tongue portion 108a extends rightwardly from crossbar portion 108b through notches 84n in the right side of each half forming an aperture when assembled.

Fiber optic cables 104 and 106 are inserted and friction fitted into connector portions 84p and 84q, respectively, and secured therein by caps 114 and 116, respectively, screwed therearound. The facing ends of the cable may extend slightly into the internal cavity or guiding channel in the module and are coaxially aligned by the connector portions and apertures 84r and 84s. Trunk portion 108c has an aperture 108d formed therethrough, and a reduced width opaque portion 108e above the aperture. The width of portion 108e is less than the width of the gap between the facing fiber optic cable ends and is vertically aligned therewith. The width of trunk portion 108c may or may not be less than the width of the gap between the cable ends; this allows the width of portion 108c to be sized large enough to provide sufficient strength and rigidity thereof and to provide a snugger, though freely slidable, fit in the guiding channel in the module, thus assuring consistent vertical motion of the shutter without canting, flexing, etc. This is important for precise interruption of the optical path between the cable ends by portion 108e.

FIGS. 6 to 9 show a normally closed switch wherein plunger 86 is biased to a normal up position whereby an optical path is established through shutter aperture 108d between the facing ends of fiber optic cables 104 and 106. Downward movement of the plunger moves the shutter downwardly such that opaque reduced portion 108e interrupts the optical path between the cable ends. The switch can be easily converted to a normally open switch by rotating module 84 180° about a horizontal left-right axis, FIGS. 8 and 9, since the module is symmetrical about said axis. With the plunger up, the light path is blocked by portion 108e; downward movement of the plunger against the bias of spring 88 moves aperture 108d into the gap between the facing fiber optic cable ends to thus permit optical transmission therebetween.

Figure 10:
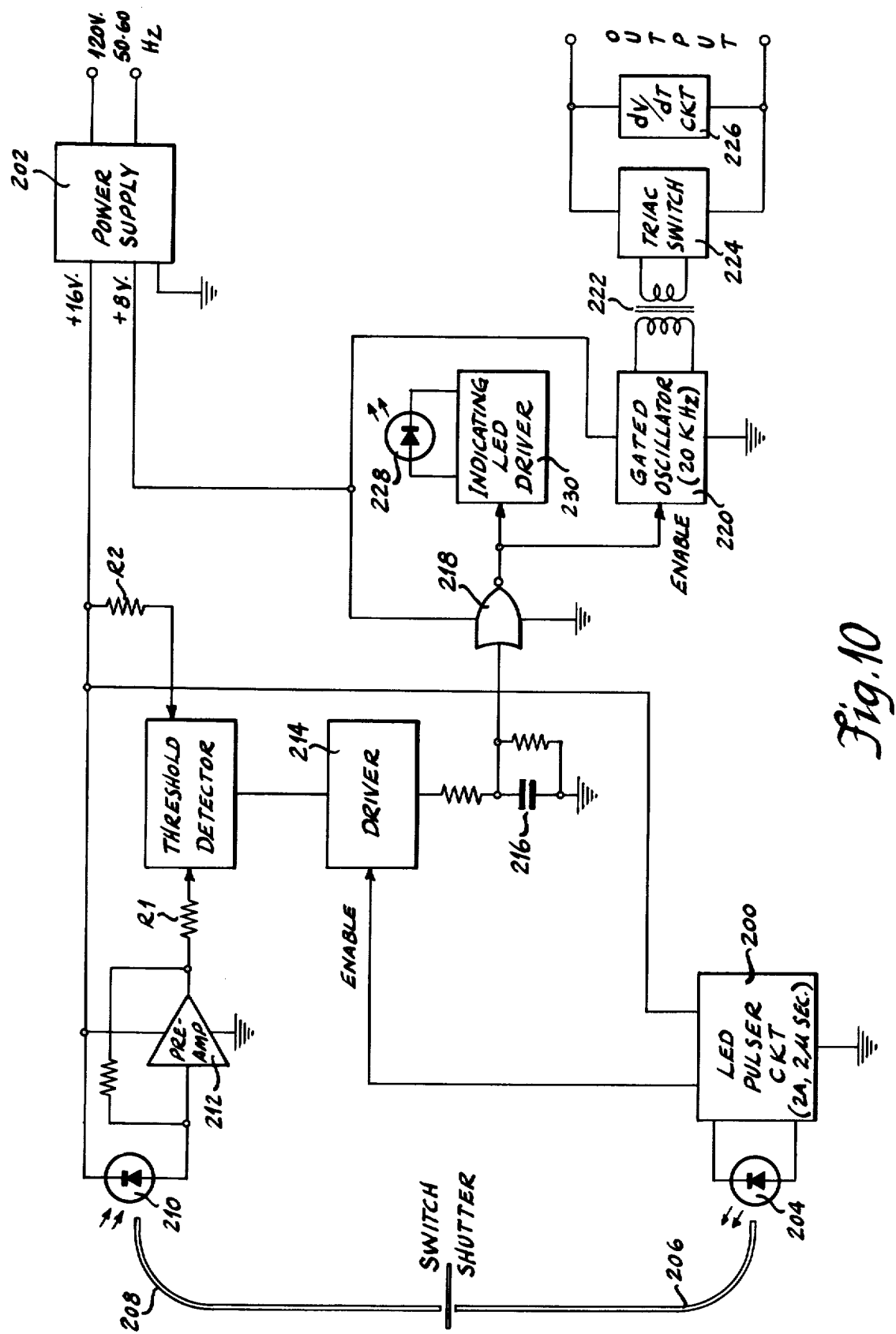
FIG. 10 is a schematic circuit diagram showing a converter circuit to provide an electrical signal in response to an optical signal.

FIG. 10 shows a converter circuit which could be used with the invention comprising a system for generating a train of light pulses and detection circuitry for detecting these received pulses to enable an isolated triac switch.

Power to LED (light emitting diode) driver 200 is derived from a zener regulated supply 202 operating from a 120 V AC source. LED 204 is driven at 2A for 2 microseconds, at a repetition rate of 1.8 kHz. The end of the fiber optics cable 206 is placed as close as practical to the LED chip. Received light from fiber optics cable 208 is coupled into photo diode 210 and the signal is amplified in a preamplifier 212. If the signal current through R1 is adequate to overcome the threshold current through R2, driver 214 is activated. However, the driver can only deliver current into the integrating network 216 during the period when enabled by the LED pulser circuit 200. When sufficient voltage has been accumulated across the integrating circuit to cause the output of gate 218 to go from high to low, a gated oscillator 220 is enabled. This signal is coupled via isolation transformer 222 into the gate of a triac 224 and causes it to become conductive. A dv/dt suppression circuit 226 may also be used. An LED indicator 228 and driver 230 may be added at the output of gate 218 if desired. It is preferred that light in the visible red (660 nanometers) region of the spectrum be transmitted through the fiber optic cables, through electromagnetic waves of other wavelengths may of course be used.

The converter circuit is not a constraint of the invention, but rather is included herein for completeness of disclosure. There are numerous types of well known conversion circuitry which may be used with the present invention.

As aforenoted, the module enables accurate axial and lateral positioning of the facing cable ends to minimize transmission losses in the gap therebetween. The following tables indicate transmission loss data achieved with the present invention.

Figure 11:
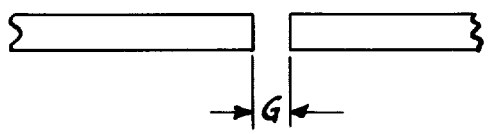
FIGS. 11-13 illustrate various terms used in graphs and tables herein.
Figure 12:
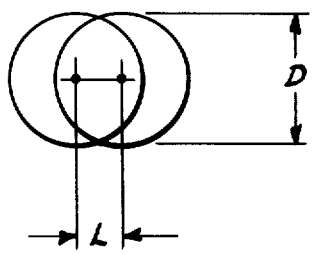
Figure 13:
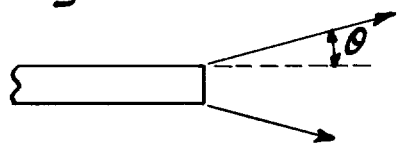

Table I shows dB losses for various gaps G and lateral displacement L. G is the axial distance between the facing cable ends, i.e. the width of the gap therebetween, and L is the lateral displacement between the central axes of the cables, as shown in FIGS. 11 and 12. The dB loss is defined in terms of a ratio of power output to power input:

$$dB = 10 \log \frac{P \text{ out}}{P \text{ in}}$$

where P out is the output power in watts and P in is the input power in watts. Glass cables were used having a length of 1 meter and each having a core diameter of 200 micrometers. The cable ends had a numerical aperture of 0.27, where numerical aperture is defined as sin $\theta$ where $\theta$ is defined as the angle between the outermost edge of the dispersed cone of light and straight-through transmission, as shown in FIG. 13. The top row of the table gives G in inches and the left column gives L in inches. The loss is given in dB and is entered in the respective row and column corresponding to L and D.

For example, a gap of 0.025 inch and a lateral displacement of 0.003 inch produce a loss of 5.9 dB.

Table II is like Table I except that cables with plastic cores are used, having a diameter of 400 micrometers. The plastic core end has a numerical aperture of 0.33.

Table III shows the results obtained when light is transmitted from a 200 micrometer diameter glass core to a 400 micrometer diameter plastic core.

Table IV is like Table III except that the direction of light transmission is reversed, i.e. light travels from the larger diametered core to the small diametered core.

Figure 14:
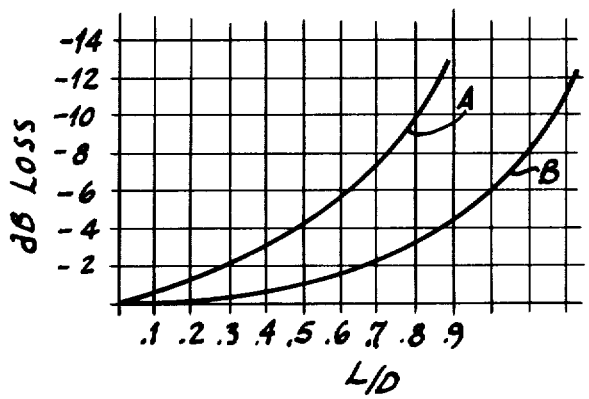
FIG. 14 is a graph showing the effect upon transmission loss of lateral displacement of the facing cable ends.

FIG. 14 graphically illustrates the effect upon dB loss of lateral displacement of the cables by plotting dB loss against the ratio L/D where D is the core diameter of the receiving cable, and assuming a minimum axial gap between the facing ends of the cables. Curve A represents light transmission from a 200 micrometer diameter cable to a 200 micrometer diameter cable; dB loss is calculated from the relation:

$$dB = 10 \log \left[ \frac{\frac{1}{2}D\pi - \sin^{-1}\frac{L}{D} - L \cos \sin^{-1}\frac{L}{D}}{\frac{1}{2}\pi D} \right]$$

This relation is valid for sending and receiving cables of equal core diameter. The theoretical curve A is found to fit very well with the empirical data recorded therefor. Curve B is an empirical curve for transmission from a 400 micrometer diameter cable to a 200 micrometer diameter cable.

TABLE I

| G<br>L | 0 | .005 | .010 | .015 | .025 | .035 | .055 | .075 | .115 |
|---|---|---|---|---|---|---|---|---|---|
| 00 | 0 | −.6 | −1.6 | −2.8 | −5.3 | −7.5 | −10.9 | −13.6 | −17.1 |
| .001 | −.4 | −.9 | −1.9 | −2.9 | −5.3 | −7.5 | −10.9 | −13.8 | −17.1 |
| .002 | −1.5 | −1.8 | −2.5 | −3.3 | −5.6 | −7.5 | −10.9 | −13.8 | −17.1 |
| .003 | −2.9 | −3.1 | −3.3 | −4.1 | −5.9 | −7.5 | −10.9 | −13.8 | −17.1 |
| .004 | −4.0 | −4.7 | −5.3 | −5.3 | −6.7 | −8.6 | −10.8 | −13.8 | −17.1 |
| .005 | −6.3 | −7.1 | −7.1 | −7.1 | −8.0 | −8.6 | −11.1 | −13.8 | −17.1 |
| .006 | −11.0 | −10.1 | −9.3 | −8.6 | −9.3 | −9.3 | −11.5 | −13.8 | −17.5 |
| .007 | −17.0 | −14.0 | −12.3 | −11.1 | −10.0 | −10.1 | −11.8 | −13.8 | −17.5 |
| .008 | 00 | | −17.0 | −14.1 | −11.0 | −11.0 | −12.5 | −14.0 | −17.5 |
| .009 | | | | −17.0 | −14.0 | −12.3 | −12.7 | −14.3 | −17.5 |
| .010 | | | | | −17.0 | −14.0 | −13.1 | −14.5 | −17.5 |
| .011 | | | | | | −14.0 | −13.5 | −14.8 | −17.5 |
| .012 | | | | | | −17.0 | −14.0 | −15.0 | −17.5 |
| .013 | | | | | | | −14.7 | −15.3 | −18.0 |
| .014 | | | | | | | −15.6 | −15.9 | −18.0 |
| .015 | | | | | | | −16.6 | −16.2 | −18.6 |
| .016 | | | | | | | −18.0 | −16.7 | −18.6 |
| .017 | | | | | | | −19.2 | −17.0 | −18.6 |
| .018 | | | | | | | −21.0 | −18.0 | −19.3 |
| .019 | | | | | | | −22.3 | −19.2 | −19.3 |
| .020 | | | | | | | −31.0 | −20.0 | −19.3 |

TABLE II

| G<br>L | 0 | .005 | .010 | .015 | .020 | .030 | .040 | .060 | .080 | .100 |
|---|---|---|---|---|---|---|---|---|---|---|
| 0 | −.0 | −.55 | −1.05 | −1.60 | −2.43 | −3.67 | −5.1 | 7 7.97 | −9.6 | — |
| .001 | −.10 | −.69 | −1.05 | −1.76 | −2.61 | −3.67 | | | | |
| .002 | −.43 | −.92 | −1.18 | −1.91 | −2.80 | −3.90 | | | | |
| .003 | −.79 | −1.19 | −1.46 | −2.25 | −3.01 | −3.90 | | | | |
| .004 | −1.18 | −1.46 | −1.76 | −2.43 | −3.22 | −4.19 | −6.23 | | | |
| .005 | −1.76 | −3.05 | −2.25 | −2.80 | −3.44 | −4.47 | −6.40 | −8.10 | −10.4 | −12.2 |
| .006 | −2.43 | −2.60 | −2.80 | −3.44 | −3.90 | −4.77 | | | | |
| .007 | −3.00 | −3.22 | −3.44 | −3.92 | −4.17 | −5.09 | | | | |
| .008 | −3.92 | −3.92 | −3.90 | −4.47 | −4.77 | −5.44 | | | | |
| .009 | −5.09 | −4.77 | −5.10 | −5.44 | −5.80 | −6.23 | | | | |
| .010 | −6.45 | −6.23 | −6.23 | −6.69 | −6.70 | −6.69 | −8.23 | −8.9 | −10.66 | −13.4 |
| .011 | −8.10 | −7.78 | −7.31 | −7.78 | −7.20 | −7.78 | | | | |
| .012 | −9.60 | −9.24 | −8.23 | −8.45 | −8.45 | −8.45 | | | | |

TABLE II-continued

| G<br>L | 0 | .005 | .010 | .015 | .020 | .030 | .040 | .060 | .080 | .100 |
|---|---|---|---|---|---|---|---|---|---|---|
| .013 | −21.4 | −13.2 | −9.51 | −10.7 | −9.24 | −9.24 | | | | |
| .014 | −24.2 | −16.2 | −21.1 | −21.17 | −10.20 | −10.2 | | | | |
| .015 | −29.0 | | −24.2 | −23.0 | −11.0 | −11.00 | −10.5 | −10.5 | −11.0 | −13.2 |
| .016 | | | −26.6 | −35.0 | −13.2 | −13.2 | | | | |

TABLE III

| G<br>L | 0 | .002 | .005 | .010 | .015 | .020 | .030 | .040 | .060 | .080 |
|---|---|---|---|---|---|---|---|---|---|---|
| 0 | −.15 | −.15 | −.23 | −.31 | −.65 | −1.12 | −1.76 | −3.08 | −5.51 | −7.55 |
| .001 | 0 | 0 | −.23 | −.39 | −.66 | −1.32 | −2.11 | | | |
| .002 | −.07 | −.24 | −.24 | −.57 | −.83 | −1.65 | −2.37 | | | |
| .003 | −.23 | −.41 | −.57 | −.93 | −1.12 | −2.24 | −2.78 | | | |
| .004 | −.60 | −.96 | −1.12 | −1.53 | −1.65 | −2.94 | −3.40 | | | |
| .005 | −1.64 | −1.84 | −1.88 | −2.37 | −2.11 | −3.57 | −3.75 | −4.77 | −6.42 | −8.50 |
| .006 | −2.64 | −2.78 | −2.94 | −2.40 | −2.43 | −4.33 | −4.77 | | | |
| .007 | −4.33 | −4.39 | −4.54 | −5.00 | −5.00 | −5.51 | −5.25 | | | |
| .008 | −6.40 | −6.61 | −6.40 | −6.40 | −6.40 | −6.41 | −6.09 | | | |
| .009 | −9.77 | −8.95 | −9.10 | −8.52 | −9.24 | −17.7 | −7.56 | | | |
| .010 | | −14.3 | | −11.52 | −12.1 | −19.4 | −8.52 | −8.01 | −10.6 | −10.6 |
| .011 | | −22.6 | −18.5 | | −12.9 | | −9.77 | | | |

TABLE IV

| G<br>L | 0 | .005 | .010 | .015 | .020 | .030 | .035 | .040 | .060 | .100 | .140 |
|---|---|---|---|---|---|---|---|---|---|---|---|
| 0 | 0 | −.23 | −.48 | −1.3 | −2.00 | −2.8 | −4.0 | −5.5 | −7.0 | −12.7 | −16.7 |
| .001 | 0 | −.74 | −1.3 | −1.3 | −2.00 | −3.2 | −4.1 | | −7.2 | | |
| .002 | −.23 | −.74 | −1.3 | −1.3 | −2.4 | −3.2 | −4.3 | | −7.2 | | |
| .003 | −.48 | −.74 | −1.6 | −2.0 | −2.4 | −3.2 | −4.5 | | −7.4 | | |
| .004 | −.75 | −1.0 | −1.6 | −2.4 | −3.2 | −3.8 | −4.9 | | −7.6 | | |
| .005 | −1.6 | −1.6 | −2.4 | −3.2 | −3.8 | −4.3 | −5.3 | | −7.7 | | |
| .006 | −2.4 | −2.4 | −2.4 | −3.8 | −4.3 | −5.0 | −5.8 | | −8.0 | | |
| .007 | −4.3 | −2.8 | −3.8 | −5.0 | −5.0 | −5.8 | −6.3 | | −8.2 | | |
| .008 | −5.0 | −3.8 | −4.3 | −5.8 | −5.8 | −5.8 | −6.8 | | −8.5 | | |
| .009 | −8.0 | −6.0 | −5.8 | −6.8 | −6.8 | −6.8 | −7.3 | | −8.8 | | |
| .010 | −12.7 | −6.8 | −6.8 | −8.0 | −8.0 | −8.0 | −8.0 | | −9.2 | | |
| .011 | | −9.8 | −8.1 | −9.8 | −9.8 | −9.8 | −8.8 | | −9.6 | | |
| .012 | | −12.8 | −12.8 | −12.8 | −12.8 | −10.4 | −9.8 | | −10.0 | | |
| .013 | | | −12.8 | −12.4 | −12.8 | −14.3 | −10.7 | | −10.5 | | |
| .014 | | | | | | −15.8 | −12.4 | | −11.3 | | |
| .015 | | | | | | | −13.8 | | −12.0 | | |
| .016 | | | | | | | −15.8 | | −13.2 | | |
| .017 | | | | | | | −16.8 | | −13.8 | | |
| .018 | | | | | | | −19.8 | | −15.0 | | |
| .019 | | | | | | | | | −15.8 | | |
| .020 | | | | | | | | | −16.8 | | |
| .021 | | | | | | | | | −18.0 | | |
| .022 | | | | | | | | | −19.8 | | |
| .023 | | | | | | | | | −22.8 | | |

Figure 15:
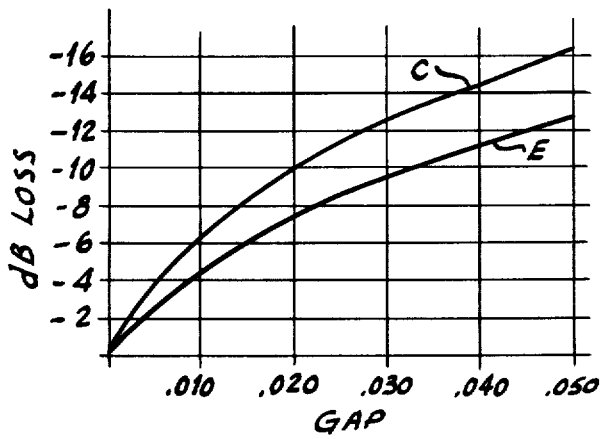
FIG. 15 is a graph showing the effect upon transmission loss of the axial gap between the facing cable ends.

FIG. 15 graphically illustrates the effect upon dB loss of the width of the gap between the facing cable ends by plotting dB loss against G, and assuming no lateral displacement. Curve C depicts transmission from a 125 micrometer diameter cable to a 125 micrometer diameter cable and curve E depicts transmission from a 200 micrometer diameter cable to a 200 micrometer diameter cable.

The tables and graphs cumulatively teach optimum combinations of axial gaps and lateral displacement for given applications to obtain the lowest dB losses. It is of course desirable to minimize both the axial gap G and the lateral displacement L, but this may not always be possible in view of shutter width, etc. Given the maximum dB loss which can be tolerated by a designated converter circuit, one can determine the allowable tolerance deviations in G and L for the particular application. For example, the converter circuit in FIG. 10 can tolerate a maximum dB loss of about −28 and still respond, thus establishing upper limits on G and L. Furthermore, one can determine which combinations of G and L will produce the best results, for example if a wide gap is desired in order to accommodate a thick shutter, then one can determine how small L must be in order to not exceed a given dB loss. It can thus be determined how close the tolerances must be held.

It has been found that G and L can best be minimized by using a single module to both mount the facing cable ends and form the guiding channel therebetween. By providing a single module which performs both functions, optimum values for the combination of G and L can be obtained, thus affording low dB losses. Furthermore, since the module is a preassembled self-contained member distinct from the switching housing, tolerances can be held to close limits because L and G are fixed before insertion into the switch housing.

It is recognized that various modifications of the present invention are possible within the scope of the appended claims.

What is claimed is:

1. A fiber optic switch comprising:
a housing;
first fiber optic cable means having an input end and an output end;
second fiber optic cable means having an input end and an output end;
mounting means mounting said output end of said first fiber optic cable means and said input end of said second fiber optic cable means within said housing in spaced end to end facing relation substantially colinearly aligned;
converter means including light source means adjacent said input end of said first fiber optic cable means, detector means adjacent said output end of said second fiber optic cable means and means responsive to the transmission of light from said light source means through said first and second fibre optic cable means to said detector means to perform an electrical switching function;
shutter means mounted for movement substantially perpendicular to the colinear axis of said facing ends of said first and second fiber optic cable means, said shutter means having a light-blocking portion movable into the gap between said facing ends to block the optical path therebetween and movable out of said gap to re-establish said path; and
operator means movably mounted to said housing and operatively connected to said shutter means for effecting said movement thereof,
wherein said mounting means also forms a narrow elongated guiding channel substantially perpendicular to said colinear axis of said facing cable ends and intersecting said gap therebetween, said shutter means being disposed in said channel, whereby said mounting means performs the dual functions of mounting said facing cable ends and guiding said movement of said shutter means to afford accurate lateral and axial positioning of said cable ends to minimize transmission losses in the gap therebetween and to afford precise optical switching, and
wherein said mounting means has linearly aligned detents formed on opposite sides of and axially spaced by said channel, said detents providing a tight fit of said facing cable ends to minimize tolerance deviations thereof, lateral and axial positioning of said facing cable ends being fixed relative to said mounting means independently of said housing.

2. The switch according to claim 1 wherein said mounting means comprises a preassembled self-contained module insertable into said housing.

3. The switch according to claim 2 wherein said module comprises a pair of matingly assembled halves, each half having a generally planar portion with a shallow generally planar recess formed therein facing the other half to form said channel when assembled, each half having an aperture through said planar portion communicating with said recess to thus form said detents.

4. The switch according to claim 3 wherein said shutter means is an integral member linearly reciprocal in said channel formed by said recesses and having a tongue portion engaged by said operating means, each of said halves having a slot formed on the end thereof to form an aperture through which said tongue portion extends externally of said channel when said halves are assembled.

5. The switch according to claim 4 wherein said light-blocking portion of said shutter member has a width less than the width of the remainder of said shutter member disposed in said channel to permit said remainder of said shutter member to slide flushly along the planar walls of said recesses and insuring that said light blocking portion will not strike said facing cable ends which are interference fitted in said aperture in said planar portions of said module halves.

6. The switch according to claim 4 wherein a fiber optic connector is formed on the exterior of said planar portion of each said half conjointly with said aperture therethrough.

7. The switch according to claim 4 wherein each said half has another recess deeper than and communicating with said first mentioned recess therein to form said guiding channel, and wherein said shutter member has a shoulder portion formed complementary to said deeper recesses to afford additional guidance of said shutter member in said channel.

8. The switch according to claim 7 wherein said module has a generally T-shaped configuration, said planar portions of said halves comprising the trunk portion of the T, and those portions of said halves in which said deeper recesses are formed comprising the crossbar portion of the T.

9. The switch according to claim 8 wherein said crossbar portion has mounting wings formed on the opposite ends thereof for mounting said module in said housing.

10. The switch according to claim 4 wherein said shutter member is enclosed within said module except for said externally extending tongue portion, and wherein said module is symmetrical about an axis perpendicular to said facing cable ends and to said movement of said shutter member to thereby permit insertion of said module into said housing in either of two 180° rotated positions about said symmetry axis to afford opposite orientations of said light-blocking portion of said shutter member with respect to said operator means and hence afford choice of normally open or normally closed optical switching without additional or modified parts.

11. The switch according to claim 4 wherein said operator means is of the linearly reciprocal plunger type movable in a direction parallel to movement of and laterally spaced from said shutter member, said tongue portion being mechanically coupled to said plunger.

12. The switch according to claim 11 wherein said housing has two side by side compartments divided by a central wall having an opening through which said tongue portion extends to directly engage said plunger.

13. The switch according to claim 3 wherein each said half is identically formed to thus assure colinear alignment of said apertures in said planar portions when matingly assembled.

14. The switch according to claim 2 wherein said module comprises a unitary member, said sides thereof forming said channel being integral with each other to provide accurate colinear alignment of said detents.

15. The switch according to claim 14 wherein said channel is formed in a vertical plane through and is open at the top, right and bottom of said module, and wherein said shutter means comprises an integral planar member vertically reciprocal in said channel.

16. The switch according to claim 15 wherein said detents comprise a pair of grooves, one formed on each of said sides and extending along said colinear axis of said facing cable ends and further comprising retainer means compressively holding said facing cable ends in said grooves, the formation of said grooves colinearly on a unitary member affording said accurate alignment.

17. The switch according to claim 16 wherein said retainer means comprises a pair of retainer members mounted to said module and a pair of resilient pads each disposed between a respective retainer member and cable to retain said facing cable end in said groove.

18. The switch according to claim 17 wherein said grooves are formed on a horizontal surface below the top of said module, said retainer members being mounted to said horizontal surface.

19. The switch according to claim 18 wherein said channel has a variable width, a narrow section thereof being between said facing cable ends, and wherein said retainer members have portions extending downwardly into a wider section of said channel adjacent said narrow section to effectively narrow the width of said wider section of said channel and afford closer guidance of said shutter member.

20. The switch according to claim 16 comprising means biasing said shutter member upwardly into engagement with a lever coupled to said operator means for driving said shutter member downwardly against the bias of said biasing means, and comprising a template mounted to the top of said module and overlying said channel, said template having an opening through which said shutter member extends to engage said lever, said shutter member having shouldered portions formed thereon which engage the underside of said template to limit the upward movement of said shutter member.

21. The switch according to claim 20 wherein said biasing means comprises a leaf spring mounted to the underside of said module and extending below said channel to engage said shutter member.

22. The switch according to claim 21 wherein said lever has an aperture through which a top portion of said shutter member extends, another top portion of said shutter member engaging the underside of said lever, and wherein said leaf spring has an aperture through which a bottom portion of said shutter member extends, another bottom portion of said shutter member engaging the topside of said leaf spring.

23. The switch according to claim 20 wherein said lever has an arcuate portion from one side of which extends a first planar portion engaging said shutter member and from the opposite side of which extends a second planar portion engaging said operator means, and comprising a plate member mounted to said operator means and disposed above said module, said arcuate portion of said lever engaging said plate member, said first planar portion of said lever extending beyond said plate member to overly said channel, said lever being rockable about said arcuate portion to translate movement of said operator means to vertical movement of shutter member.

24. The switch according to claim 23 wherein said operator means comprises a limit switch operating head and housing assembly.

25. The switch according to claim 15 wherein said shutter member has an opening formed therein in vertical alignment with said light blocking portion, said shutter member being movable between a first position wherein said light-blocking portion is disposed in said gap between said facing cable ends to block the optical path therebetween, and a second position wherein said opening in said shutter member is disposed in said gap between said facing cable ends to permit passage of light therebetween.

26. The switch according to claim 25 wherein said shutter member, except for said opening and said light-blocking portion, is symmetrical about an axis perpendicular to said colinear axis of said facing cable ends and to said vertical direction of movement of said shutter member, whereby rotation of said shutter member 180° about said symmetry axis reverses the orientation of said light-blocking portion and said opening in said shutter member such that said light-blocking portion when reversed is in said gap when said shutter member is in said second position and said opening in said shutter member when reversed is in said gap when said shutter member is in said first position, and hence afford choice of normally open or normally closed optical switching without additional or modified parts.

27. The switch according to claim 22 wherein said shutter member has an opening formed therein in vertical alignment with said light-blocking portion, said shutter member being movable between a first position wherein said light-blocking portion is disposed in said gap between said facing cable ends to block the optical path therebetween, and a second position wherein said opening in said shutter member is disposed in said gap between said facing cable ends to permit passage of light therebetween, and wherein said shutter member, except for said opening therein and said light-blocking portion, is symmetrical about an axis perpendicular to said colinear axis of said facing cable ends and to said vertical direction of movement of said shutter member, whereby rotation of said shutter member 180° about said symmetry axis reverses the orientation of said light-blocking portion and said opening in said shutter member such that said light-blocking portion when reversed is in said gap when said shutter member is in said second position and said opening in said shutter member when reversed is in said gap when said shutter member is in said first position, and hence afford choice of normally open or normally closed optical switching without additional or modified parts.

28. The switch according to claim 14 wherein said housing is a standard limit switch housing whereby said module affords simple and economical conversion from a standard electric limit switch to a fiber optic limit switch with a minimum of new or modified parts.

29. The switch according to claim 2 wherein said housing is a standard double compartment plunger type switch housing, said operator means comprises a plunger in one compartment, said module being disposed in the other compartment displacing a second plunger, whereby said module affords simple and economical conversion from a standard double plunger type electric switch to a single plunger fiber optic switch with a minimum of new or modified parts.

30. A fiber optic switch comprising:
a housing;
first fiber optic cable means having an input end and an output end;
second fiber optic cable means having an input end and an output end;
mounting means mounting said output end of said first fiber optic cable means and said input end of said second fiber optic cable means within said housing in spaced end to end facing relation substantially colinearly aligned;
converter means including light source means adjacent said input end of said first fiber optic cable means, detector means adjacent said output end of said second fiber optic cable means and means responsive to the transmission of light from said light source means through said first and second fiber optic cable means to said detector means to perform an electrical switching function;

shutter means mounted for movement substantially perpendicular to the colinear axis of said facing ends of said first and second fiber optic cable means, said shutter means having a light-blocking portion movable into the gap between said facing ends to block the optical path therebetween and movable out of said gap to re-establish said path; and operator means movably mounted to said housing and operatively connected to said shutter means for effecting said movement thereof, wherein said mounting means also forms a narrow elongated guiding channel substantially perpendicular to said colinear axis of said facing cable ends and intersecting said gap therebetween, said shutter means being disposed in said channel, whereby said mounting means performs the dual functions of mounting said facing cable ends and guiding said movement of said shutter means to afford accurate lateral and axial positioning of said cable ends to minimize transmission losses in the gap therebetween and to afford precise optical switching, and wherein said shutter means is an integral member linearly reciprocal in said channel between a first position wherein said light-blocking portion blocks said light path between said facing cable ends and a second position wherein said light-blocking portion is out of said gap between said facing cable ends to permit passage of light therebetween, and wherein said shutter member, except for said light-blocking portion, is symmetrical about an axis perpendicular to said colinear axis of said facing cable ends and to said movement of said shutter member, whereby rotation of said shutter member 180° about said symmetry axis reverses the orientation of said light-blocking portion such that said light-blocking portion when reversed is in said gap when said shutter member is in said second position and is out of said gap when said shutter member is in said first position.

* * * * *